United States Patent [19]

Miller

[11] Patent Number: 4,681,006
[45] Date of Patent: Jul. 21, 1987

[54] BLADE TENSIONING DEVICE FOR SCROLL SAW

[75] Inventor: David Miller, Tupelo, Miss.

[73] Assignee: Delta International Machinery Corp., Pittsburgh, Pa.

[21] Appl. No.: 757,004

[22] Filed: Jul. 19, 1985

[51] Int. Cl.⁴ ............... B23D 49/04; B23D 51/14
[52] U.S. Cl. .................................. 83/782; 83/581.1; 83/699
[58] Field of Search ............ 83/782, 783, 699, 581.1, 83/662; 403/DIG. 8, DIG. 9

[56] References Cited

U.S. PATENT DOCUMENTS

| Re. 7,726 | 6/1877 | Plummer. |
|---|---|---|
| 169,475 | 11/1875 | Pratt. |
| 170,456 | 11/1875 | Smith. |
| 189,461 | 4/1877 | House. |
| 220,705 | 10/1879 | Dearborn. |
| 398,803 | 2/1889 | Sedwick. |
| 1,544,425 | 6/1925 | Blank. |
| 1,820,294 | 8/1931 | Anderson. |
| 1,848,540 | 3/1932 | Nicklos et al. ............ 83/581.1 X |
| 1,877,705 | 9/1932 | Tautz. |
| 2,090,195 | 8/1937 | Grob. |
| 2,208,843 | 7/1940 | Hedgpeth. |
| 2,692,622 | 10/1954 | Heese. |
| 2,721,587 | 10/1955 | Dremel. |
| 4,503,742 | 3/1985 | Sutton. |

OTHER PUBLICATIONS

The Eagle Precision Scroll Saw, Exclusive "C" Arm for Safety, manufactured by RBI Industries, Inc., Pleasant Hill, MO, date unknown.

Primary Examiner—Frank T. Yost
Attorney, Agent, or Firm—Merchant, Gould, Smith, Edell, Welter & Schmidt

[57] ABSTRACT

A scroll saw is disclosed having upper and lower reciprocable arms terminating in upper and lower ends having a saw blade connected therebetween. A releasable blade tensioning device is mounted on the upper end including a blade support member having a central portion pivotally mounted to the upper end with a first end thereof extending along the upper arm and a second end connectable to the saw blade. The blade support member is pivotable between a first blade tensioning position and a second blade tension releasing position, and a manually rotatable cam is mounted on the first end and a manually operable adjustment screw engageable therewith is mounted on the upper arm. The manually rotatable cam is constructed and arranged to force the first end and the upper arm apart in one rotated position thereof to move the blade support member to the first position, and to permit the blade support member to move to the second position in another rotated position thereof. The manually operable adjustable screw permits adjustment of the tension on the saw blade.

11 Claims, 4 Drawing Figures

BLADE TENSIONING DEVICE FOR SCROLL SAW

BACKGROUND OF THE INVENTION

This invention relates to jigsaws or scroll saws which have a saw blade connected between the free ends of the arms of a generally C-shaped or U-shaped member which is reciprocated about a pivot point at the closed end of the member to drive the saw blade. Means are provided to quickly connect or disconnect the saw blade between the ends of the arms. Typically, at least one end of the saw blade is clamped between a pair of blade holders, an example of which is shown in FIG. 6 of the Sutton U.S. Pat. No. 4,503,742, issued Mar. 12, 1985. It is difficult to adjust the tension on the blade by using such blade holders, but if the blade is not correctly tensioned it may tend to break upon encountering a workpiece.

An example of a releaseable prior art blade tensioning device is disclosed in the Dremel U.S. Pat. No. 2,721,587, issued Oct. 25, 1955. The Dremel jigsaw has a pivotable blade holder attached to the end of the upper arm which can be pivoted between blade tightening and blade releasing positions. In the blade tightening position, a lever can be pivoted into position to lock the blade carrier in place, with the blade under tension. However, no means are provided to readily adjust the amount of tension being applied to the blade.

SUMMARY OF THE INVENTION

The present invention provides an improved blade support member pivotally mounted to the end of the upper arm having an outer end attachable to the blade and an inner end disposed generally below the arm. A rotatable, offset cam member is mounted on the inner end of the blade support member for engagement with the bottom end of an adjustable screw extending through and threadedly engaged with an opening in the arm. The cam member can be rotated manually in one direction to pivot the blade support member so as to tighten the blade and in the other direction to release tension on the blade. The adjustment screw can be used in two ways to adjust the tension on the blade. First, it may be adjusted prior to tensioning of the blade so that the starting position of the blade support member correctly corresponds to the length of the blade such that when the cam member is rotated to the blade tensioning position the correct tension will be obtained. Secondly, the adjustment screw permits fine tuning of the blade tension after the cam member has been rotated into the full blade tensioning position. A handle is attached to the cam member to permit quick release or tensioning of the blade and, as noted above, the actual tension on the blade can quickly be adjusted by means of the threaded adjustment screw.

DETAILED DESCRIPTION OF THE INVENTION

Figure 1:
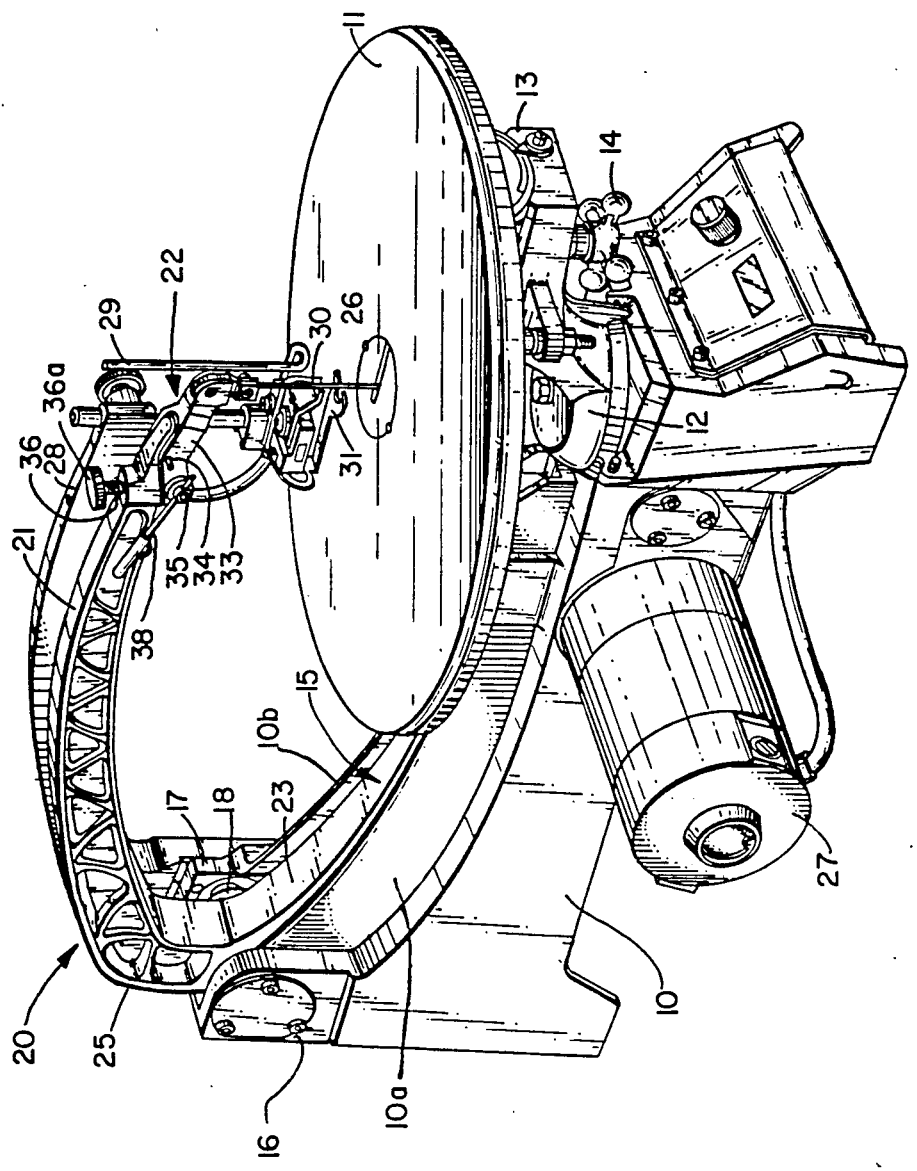
FIG. 1 is a view in perspective taken from one side and generally above a C-arm scroll saw according to my invention.

Referring now to the drawings, wherein like numerals are used throughout the several views to identify like elements of the invention, there is disclosed a scroll saw having an elongated base 10 having a table 11 mounted at one end to support a workpiece. Table 11 is mounted on a support frame including a swivel member 12 which permits the table to be rotated about a vertical axis, and a trunion assembly 13 which can be released by a star handwheel 14 to permit the table to be tilted about an axis extending generally along the length of the base 10.

Base 10 includes oppositely disposed side wall members 10a, 10b defining between them an elongated opening or well 15. At the end of base 10 opposite from table 11 side wall members 10a, 10b define a pair of upstanding, spaced bearing support members 16, 17. Mounted between the bearing support members 16, 17 for rotation therein is a horizontally extending pivot shaft 18.

A yoke or C-arm member 20 is provided having an upper arm 21 terminating in an upper end 22, a lower arm 23 terminating in a lower end 24, and a curved bight 25 connecting the upper arm 21 and the lower arm 23. Bight 25 of C-arm member 20 is mounted on pivot shaft 18. A saw blade 26 is connected between upper end 22 and lower end 24 and an electric motor 27 is provided to reciprocate C-arm member 20 on pivot shaft 18 to effect movement of the saw blade 26.

A support arm 28 connected at its rear end to bearing support member 17 extends along upper arm 21 and at its free end provides support for a blade guard 29, an air nozzle 30 and a holddown member 31.

A releasable blade tensioning device 33 is pivotally mounted to upper end 22 of upper arm 21 for pivotal movements about a horizontally extending pivot pin 34 between a blade tensioning position and a blade tension releasing position. A manually rotatable cam member 35 is mounted on the end of blade tensioning member 33 opposite from its connection to saw blade 26 for engagement with the bottom end of a manually adjustable pin 36 which extends through and is threadedly engaged with an opening in upper arm 21.

Figure 2:
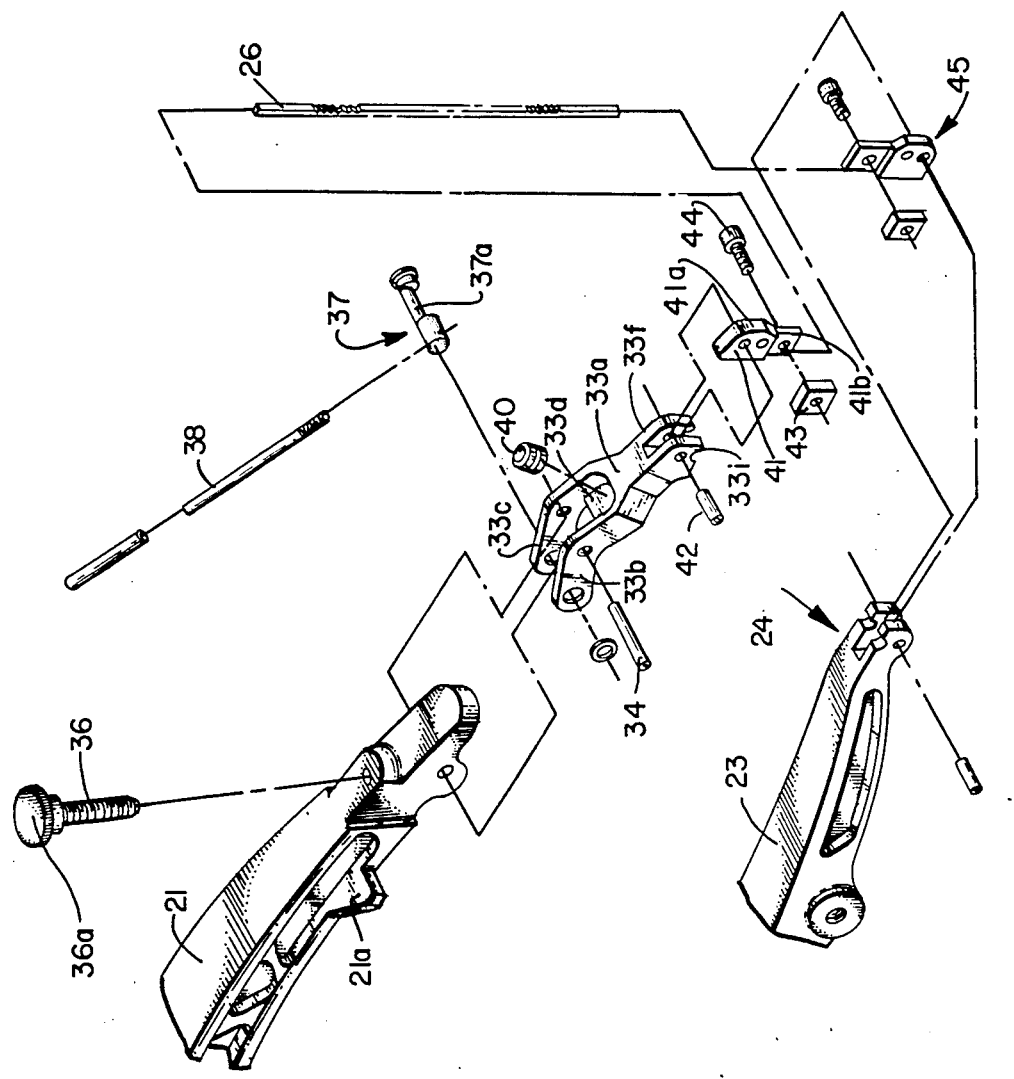
FIG. 2 is a fragmentary exploded view of the blade tensioning device.
Figure 3:
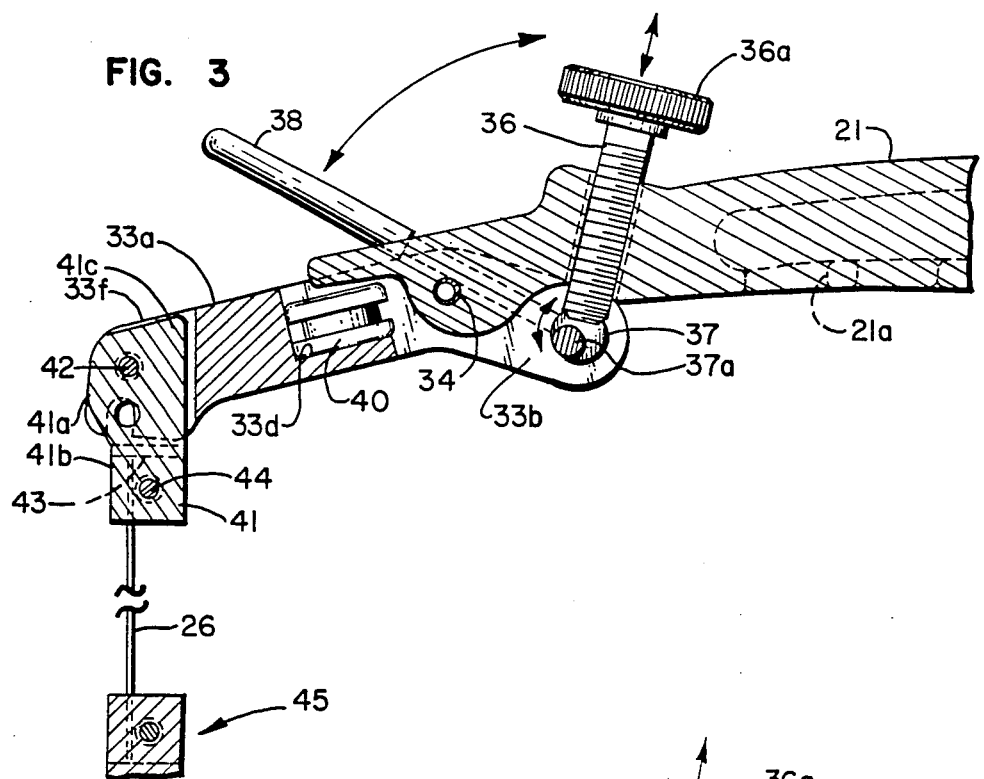
FIG. 3 is an enlarged, fragmentary sectional view of the blade tensioning device taken along a vertical plane extending generally through the center thereof, showing the device in the blade release position.
Figure 4:
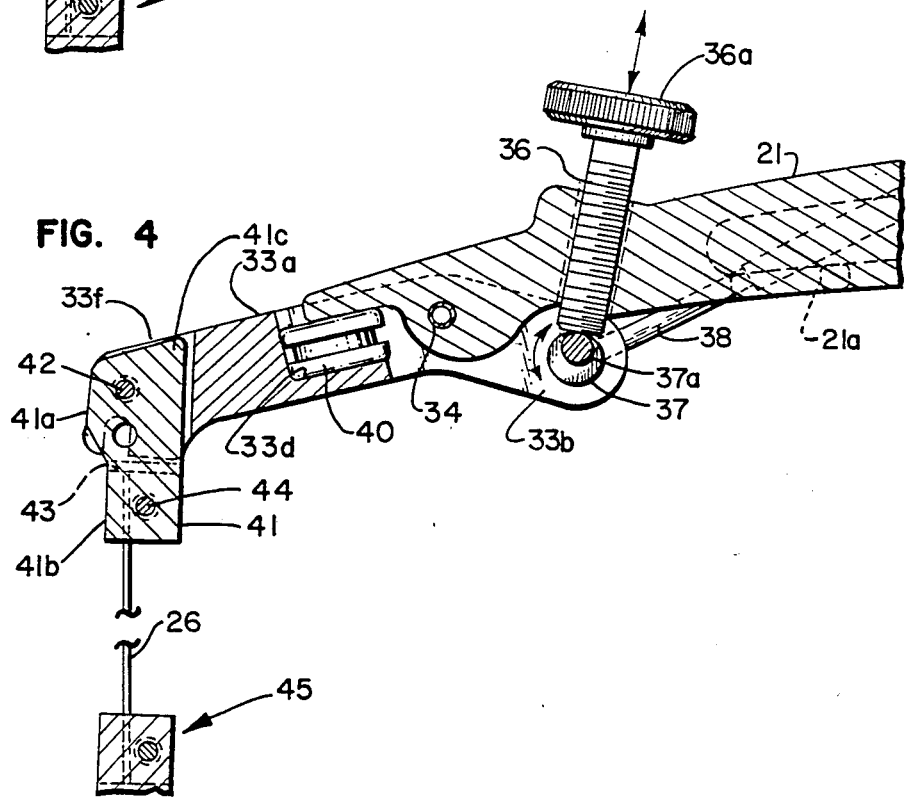
FIG. 4 is a view like FIG. 3 showing the blade tensioning device in the locked, blade tensioning position.

The releasable blade tensioning device 33 is shown in more detail in FIGS. 2, 3 and 4. The device includes a blade support member 33a which has a bifurcated inner end comprising a pair of flat, coplanar end portions 33b, 33c extending along opposite sides of the upper end 22. Blade support member 33a is pivotally supported on end 22 by means of pivot pin 34 extending horizontally through openings in the oppositely disposed end portions 33b, 33c, the openings being located near a central portion of blade support member 33a. End portions 33b, 33c are angled downwardly beginning at about the pivot pin 34, with respect to the remaining portions of blade support member 33a, so that in the preferred embodiment, the inner ends of end portions 33b, 33c extend below upper end 22, as best shown in FIGS. 3 and 4.

The inner ends of end portions 33b, 33c have oppositely disposed openings in which manually rotatable pin 37 is mounted to thus extend across and below upper arm 22. Pin 37 has bearing portions at opposite ends which rotate in the oppositely disposed openings and has an enlarged head at one end. A lever 38 extends normal to and is threadedly engaged into an opening in the other end of pin 37 to provide for manual rotation thereof. Pin 37 has a central portion of smaller diameter offset from a central axis of the pin, the offset central portion 37a being engageable with the end of manually adjustable pin 36. Offset portion 37 a thus functions as a cam member cooperating with the end of pin 36 to pivot blade support member 33a between the two positions shown in FIGS. 3 and 4. In FIG. 3, lever 38 has been rotated to the blade tension releasing position in which the cam member does not exert force against the bottom end of pin 36. To increase tension on the blade, lever 38 can be moved to the position shown in FIG. 4, so that central portion 37a engages the bottom end of pin 36 and forces end portions 33b, 33c downwardly to pivot the outer end of blade support member 33a upwardly to the blade tensioning position. Pin 36 can be rotated by means of knurled head 36a to manually adjust the amount of tension to be applied to blade 26, either when the blade tension is released as shown in FIG. 3 or to provide fine tuning with the blade under tension as shown in FIG. 4.

In the blade tensioning position shown in FIG. 4, lever 38 rests against a stop member 21a on upper arm 21, and central portion 37a is slightly over center so that the tension tends to hold lever 38 and pin 37 in the position shown.

The free end 22a of upper arm 21 which extends beyond pivot pin 34 is formed as a generally flat finger which extends over a portion of blade support member 33a. A recess 33d is formed in the portion of blade support member 33a which faces free end 22a, and a resilient grommet or pad 40 is carried by recess 33d. Pad 40 is preferably made of rubber and is of sufficient thickness to substantially fill the space between the bottom of recess 33d and the bottom surface of free end 22a, such that it is engaged by free end 22a when the blade support member 33a moves to the blade tensioning position shown in FIG. 4. Resilient pad 40 serves to compensate for small irregularities in the adjustment of the blade support member and also functions as a shock absorber. Its most important function, however, is to keep tension on the mechanism in the blade tensioning position shown in FIG. 4 so that the mechanism 33 will not release if the blade breaks.

Blade support member 33a has a bifurcated ouer end including end portions 33e, 33f having a vertical slot between them. A blade holder 41 is pivotally suspended in the slot between end portions 33e, 33f by means of a pin 42. Blade holder 41 is a generally flat member having an upper portion 41a in the slot and a lower portion 41b of reduced thickness extending therebelow. Portions 41a and 41b define a generally horizontally extending abutment between the portions. A square locking nut 43 is threadedly clamped to bottom portions 41b of the blade holder by means of a threaded screw 44 extending through an opening in portion 41b. Nut 43a is sized so that one edge thereof engages the abutment between portions 41a and 41b to prevent rotation thereof. The upper end of saw blade 26 is clamped between nut 43 and lower portion 41b to hold the blade during operation of the saw. As shown in FIG. 2, a similar blade holder 45 is secured to a bifurcated end portion of lower arm 23 to attach blade 26 to that arm.

As shown in FIGS. 3 and 4, there is space between the rear edge of blade holder 41 and the bottom of the slot between end portions 33e, 33f so that the blade holder 41 can pivot rearwardly about the pin 42 when the blade 26 encounters a workpiece. Permitting blade holder 41 to pivot a small amount about pin 42 helps prevent breakage of blade 26 because the tension is spread more evenly along the length of the blade. Blade holder 41 has an elongated lobe 41c at its upper rear corner adjacent the upper end of the slot, engageable with the base of the slot to prevent the blade holder from rotating in the opposite direction in the event of blade breakage. Thus, if the blade breaks, the end portion of the blade which remains clamped in blade holder 41 cannot swing up toward the operator.

To attach a saw blade 26 to C-arm member 20, adjustment screw 36 is initially set so that the distance between blade clamps 41 and 45 is approximately correct for the length of the saw blade being used. The ends of the saw blade 26 are then clamped into the blade clamps 41 and 45 with the blade tensioning mechanism 33 in the blade tension releasing position shown in FIG. 3. At that point, further adjustments to pin 36 can be made if desired. Lever 38 is then rotated rearwardly to the position shown in FIG. 4 to pivot blade support member 33a to the blade tensioning position shown in FIG. 4. Further adjustments to the blade adjustment screw 36 can be made at different times during the process in order to arrive at the correct tension on the blade. When the blade is to be removed or replaced, lever 38 is moved back to the blade tension releasing position shown in FIG. 3 at which time the blade support member 33a pivots to the release position shown in FIG. 3, thus releasing tension on the blade so that it can be removed, readjusted, or replaced.

The blade tensioning mechanism 33 and blade holder 41 are especially advantageous when it is desired to cut interior openings in a workpiece. Mechanism 33 is released and the end of blade 26 is released from holder 41. The workpiece is then placed over the blade with the blade extending through an opening in the workpiece, and the blade is then re-connected and placed under tension. This can be accomplished very quickly, making it a simple matter to cut such openings.

The present invention thus provides a readily adjustable and easily releasable mechanism for connecting the blade between the arms of a scroll saw.

I claim:

1. In a scroll saw having upper and lower reciprocable arms terminating in upper and lower ends having a saw blade connected therebetween, releasable blade tensioning means including a blade support member having a central portion pivotally mounted to an end of one of said arms, a first end extending generally along said one arm and a second end connectable to said saw blade, said blade support member being pivotable between a blade tensioning position and a blade tension releasing position, the improvement comprising manually operable cam means mounted on one of said first end and said one arm and engageable with separate manually adjustable means mounted on the other, and being constructed and arranged to hold said first end and said one arm apart in one position to move said blade support member to said blade tensioning positin, and to permit said blade support member to move to said blade tension releasing position in another position thereof, and said manually adjustable means mounted on the other of said first end and said one arm being engageable with said manually operable cam means to adjust the tension on the saw blade, said manually operable cam means being rotatable between said positions.

2. The scroll saw of claim 1 wherein said manually rotatable means comprises a pin mounted in said first end having a portion offset with respect to an axis of rotation thereof, said manually adjustable means being mounted in said one arm and being engageable with said offset portion.

3. In a scroll saw having upper and lower reciprocable arms terminating in upper and lower ends having a saw blade connected therebetween, releasable blade tensioning means including a blade support member having a central portion pivotally mounted to an end of one of said arms, a first end extending generally along said one arm and a second end connectable to said saw blade, said blade support member being pivotable between a blade tensioning position and a blade tension releasing position, manually operable means mounted on one of said first end and said one arm and engageable with the other, and being constructed and arranged to hold said first end and said one arm apart in one position to move said blade support member to said blade tensioning position, and to permit said blade support member to move to said blade tension releasing position in another position thereof, the improvement comprising manually adjustable means on the other of said first end and said one arm engageable with said manually operable means to permit adjustment of the tension on the saw blade, said manually operable means comprising cam means rotatable between said positions, said manually rotatable means comprising a pin mounted in said first end having a portion offset with respect to an axis of rotation thereof, said manually adjustable means being mounted in said one arm and being engageable with said offset portion.

4. In a scroll saw having upper and lower reciprocable arms terminating in upper and lower ends having a saw blade connected therebetween, releasable blade tensioning means including a blade support member having a central portion pivotally mounted to said upper end with a first end thereof extending along said upper arm and a second end connectable to said saw blade, said blade support member being pivotable between a first blade tensioning position and a second blade tension releasing position, the improvement comprising manually rotatable cam means mounted on said first end and separate manually adjustable means engageable therewith mounted on said upper arm, said manually rotatable cam means being constructed and arranged to force said first end and said upper arm apart in one rotated position thereof to move said blade support member to said first position, and to permit said blade support member to move to said second position in another rotated position thereof, said manually adjustable means being moveable to permit adjustment of the tension of the saw blade.

5. The scroll saw of claim 4 wherein said blade support member has a bifurcated inner end comprising a pair of end portions extending along opposite sides of said end of said upper arm and being connected thereto by horizontally extending pivot means, said manually rotatable means comprising a manually rotatable pin mounted in oppositely disposed openings in said opposite end portions and extending across said upper arm, said pin having a portion offset from a central axis of said pin, said offset portion being engageable with said manually adjustable means.

6. The scroll saw of claim 5 wherein said manually adjustable means comprises a threaded pin extending through and threadedly engaged with an opening in said upper arm, and having a bottom end in position to contact said offset portion of said manually rotatable pin.

7. The scroll saw of claim 5 wherein a free end of said upper arm beyond said pivot means extends over a portion of said second end of said blade support member, wherein a recess is formed in said portion of said blade support member facing said free end, and wherein a resilient pad is carried by said recess which is engaged by said free end with said blade support member in said blade tensioning position.

8. The scroll saw of claim 3 wherein said blade support member includes a bifurcated outer end comprising end portions disposed beyond said end of said upper arm and having a vertical slot therebetween, a blade holder pivotally suspended in said slot between said end portions comprising a generally flat member having an upper portion in said slot and a lower portion including means for clamping the blade thereto, said upper portion of said blade holder having a lobe formed at an upper end thereof engageable with a base of said slot to limit rotation of the blade and blade holder in the direction of the operator in the event of blade breakage.

9. The scroll saw of claim 2 wherein said blade support member includes a bifurcated outer end comprising end portions disposed beyond said end of said upper arm and having a vertical slot therebetween, a blade holder pivotally suspended in said slot between said end portions comprising a generally flat member having an upper portion in said slot and a lower portion of reduced thickness defining a generally horizontally extending abutment between said portions, and a locking nut threadedly engaged to said lower portion for clamping the blade therebetween, said abutment cooperating with said nut to prevent rotation thereof.

10. A scroll saw, comprising:
(a) a base having a table mounted at one end and a horizontal pivot shaft mounted at an opposite end;
(b) a C-member having upper and lower arms and a curved bight connecting said arms, said arms terminating in upper and lower ends having a saw blade connected therebetween and extending through said table;
(c) means mounting said C-member on said pivot shaft at said curved bight, and means for reciprocating said C-member about said pivot shaft to effect movement of said saw blade; and
(d) said saw blade being connected to said end of said upper arm by releasable blade tensioning means including a blade support member having a bifurcated inner end extending over said end of said upper arm and connected thereto by horizontally extending pivot means, an outer end disposed beyond said end of said arm and connectable to said saw blade, a manually rotatable pin mounted in oppositely disposed openings in opposite end portions of said inner end and extending below said arm, said pin having a smaller diameter central portion offset from a central axis of said pin, and means on said upper arm engageable with said central portion of said pin in one rotated position thereof to pivot said blade support member to a blade tensioning position and said pin being rotatable to another position to release tension on said saw blade, said means engageable with said central portion of said pin being adjustable to permit the tension on said saw blade to be changed.

11. The scroll saw of claim 10 wherein said adjustable means comprises a threaded pin extending through and threadedly engaged with an opening in said upper arm, and having a bottom end in position to contact said pin.

* * * * *